United States Patent
Lee

(10) Patent No.: US 9,098,713 B2
(45) Date of Patent: Aug. 4, 2015

(54) CLIPBOARD PROTECTION SYSTEM IN DRM ENVIRONMENT AND RECORDING MEDIUM IN WHICH PROGRAM FOR EXECUTING METHOD IN COMPUTER IS RECORDED

(75) Inventor: Hyung-Joo Lee, Seoul (KR)

(73) Assignee: FASOO.COM CO., LTD, Seoul (KR)

( * ) Notice: Subject to any disclaimer, the term of this patent is extended or adjusted under 35 U.S.C. 154(b) by 92 days.

(21) Appl. No.: 13/818,043

(22) PCT Filed: Jan. 25, 2011

(86) PCT No.: PCT/KR2011/000514
§ 371 (c)(1),
(2), (4) Date: Feb. 20, 2013

(87) PCT Pub. No.: WO2012/023674
PCT Pub. Date: Feb. 23, 2012

(65) Prior Publication Data
US 2013/0151864 A1 Jun. 13, 2013

(30) Foreign Application Priority Data
Aug. 20, 2010 (KR) ......................... 10-2010-0080938

(51) Int. Cl.
*G06F 21/60* (2013.01)
*G06F 21/10* (2013.01)
*G06F 21/62* (2013.01)

(52) U.S. Cl.
CPC .............. *G06F 21/602* (2013.01); *G06F 21/10* (2013.01); *G06F 21/6209* (2013.01); *G06F 2221/2107* (2013.01)

(58) Field of Classification Search
None
See application file for complete search history.

(56) References Cited

U.S. PATENT DOCUMENTS 5,504,818 A * 4/1996 Okano ........................... 713/166
5,680,616 A * 10/1997 Williams et al. .............. 707/796

(Continued)

FOREIGN PATENT DOCUMENTS

EP  1662356 A2 *  5/2006
EP  2608100 A1 *  6/2013

(Continued)

OTHER PUBLICATIONS

NNRD437107, "Method of SPY on externals of 3rd party MMC Snap-Ins", IBM Technical Disclosure Bulletin, Sep. 1, 2000, UK, issue No. 437, p. 1680.*

(Continued)

*Primary Examiner* — Andrew Nalven
*Assistant Examiner* — Walter Malinowski
(74) *Attorney, Agent, or Firm* — William Park & Associates Ltd.

(57) ABSTRACT

Disclosed are a clipboard protection system in a DRM environment and a recording medium in which a program for executing the method in a computer is recorded. An identification information management unit changes first identification information of data, which is to be stored in a clipboard, into second identification information when data stored in the clipboard is requested by a reliable object, and outputs the second identification information corresponding to identification information of the reading target data if the reliable object requests extraction of the data stored in the clipboard. A data protection unit encodes the data, which is to be stored in the clipboard, and decodes the encoded data which is read from the clipboard. If the extraction request for the data stored in the clipboard is inputted from the reliable object, a control unit delivers to a clipboard management system the second identification information corresponding to the identification information of the reading target data, and requests the encoded security data to be read and provided from the clipboard. According to the present invention, the access to the security data by a non-reliable object can be blocked.

18 Claims, 11 Drawing Sheets

(56) References Cited

U.S. PATENT DOCUMENTS

| | | | |
|---|---|---|---|
| 6,202,100 B1* | 3/2001 | Maltby et al. | 719/329 |
| 6,880,022 B1* | 4/2005 | Waldspurger et al. | 710/9 |
| 7,320,069 B1* | 1/2008 | Sundharraj et al. | 713/153 |
| 7,950,066 B1* | 5/2011 | Zuili | 726/33 |
| 7,984,513 B1* | 7/2011 | Kyne et al. | 726/30 |
| 8,489,509 B2* | 7/2013 | Kim | 705/52 |
| 2001/0000541 A1* | 4/2001 | Schreiber et al. | 713/100 |
| 2002/0019941 A1* | 2/2002 | Chan et al. | 713/185 |
| 2002/0196939 A1* | 12/2002 | Unger et al. | 380/216 |
| 2003/0093351 A1* | 5/2003 | Sarabanchong | 705/36 |
| 2003/0120686 A1* | 6/2003 | Kim et al. | 707/200 |
| 2004/0070607 A1* | 4/2004 | Yalovsky et al. | 345/746 |
| 2004/0210846 A1* | 10/2004 | Olsen | 715/761 |
| 2004/0230907 A1* | 11/2004 | Yang | 715/530 |
| 2004/0250087 A1* | 12/2004 | Ray et al. | 713/189 |
| 2005/0008163 A1* | 1/2005 | Leser et al. | 380/281 |
| 2005/0066335 A1* | 3/2005 | Aarts | 719/316 |
| 2005/0149726 A1* | 7/2005 | Joshi et al. | 713/164 |
| 2005/0223224 A1* | 10/2005 | Carpentier et al. | 713/165 |
| 2006/0075279 A1* | 4/2006 | Cameros et al. | 714/4 |
| 2006/0117178 A1* | 6/2006 | Miyamoto et al. | 713/165 |
| 2006/0156400 A1* | 7/2006 | Shevchenko | 726/26 |
| 2006/0195907 A1* | 8/2006 | Delfs et al. | 726/26 |
| 2007/0011469 A1* | 1/2007 | Allison et al. | 713/193 |
| 2007/0011749 A1* | 1/2007 | Allison et al. | 726/26 |
| 2007/0016771 A1* | 1/2007 | Allison et al. | 713/165 |
| 2007/0027998 A1* | 2/2007 | Staats | 709/230 |
| 2007/0061747 A1* | 3/2007 | Hahn et al. | 715/764 |
| 2007/0074017 A1* | 3/2007 | Schmidt et al. | 713/150 |
| 2007/0101435 A1* | 5/2007 | Konanka et al. | 726/27 |
| 2007/0150685 A1* | 6/2007 | Shevchenko | 711/167 |
| 2007/0271433 A1* | 11/2007 | Takemura | 711/164 |
| 2008/0028442 A1* | 1/2008 | Kaza et al. | 726/4 |
| 2008/0066089 A1* | 3/2008 | Kamiya et al. | 719/328 |
| 2008/0109832 A1* | 5/2008 | Ozzie et al. | 719/329 |
| 2008/0215897 A1* | 9/2008 | Doyle et al. | 713/193 |
| 2008/0243994 A1* | 10/2008 | Kropivny | 709/203 |
| 2008/0256601 A1* | 10/2008 | Dutta et al. | 726/3 |
| 2009/0106550 A1* | 4/2009 | Mohamed | 713/156 |
| 2009/0287988 A1* | 11/2009 | Cohen et al. | 715/204 |
| 2009/0327617 A1* | 12/2009 | Furuichi et al. | 711/147 |
| 2010/0146600 A1* | 6/2010 | Eldar et al. | 726/5 |
| 2010/0299759 A1* | 11/2010 | Kim et al. | 726/28 |
| 2011/0038552 A1* | 2/2011 | Lam | 382/232 |
| 2012/0124675 A1* | 5/2012 | Lee et al. | 726/28 |

FOREIGN PATENT DOCUMENTS

| | | | |
|---|---|---|---|
| JP | 2006054669 A | | 2/2006 |
| JP | 2010055371 A | * | 3/2010 |
| KR | 390086 B | * | 7/2003 |
| KR | 521338 B | * | 12/2005 |
| KR | 10-0681696 B1 | | 2/2006 |
| KR | 2006059759 A | * | 6/2006 |
| KR | 10-2007-0120413 A | | 12/2007 |
| KR | 2009019484 A | * | 2/2009 |
| KR | 10-0943318 B1 | | 2/2010 |
| WO | WO 2012023674 A1 | * | 2/2012 |

OTHER PUBLICATIONS

Sinha, "Data Paladin—An Application Independent Rights Management System", Thesis, Stony Brook University, Dec. 2008, 44 pages.*

Yu, "Display-Only File Server: A Solution against Information Theft Due to Insider Attack", DRM'04, Oct. 25, 2004, pp. 31-39.*

* cited by examiner

CLIPBOARD PROTECTION SYSTEM IN DRM ENVIRONMENT AND RECORDING MEDIUM IN WHICH PROGRAM FOR EXECUTING METHOD IN COMPUTER IS RECORDED

TECHNICAL FIELD

The present invention relates, in general, to a clipboard protection system in a Digital Rights Management (DRM) environment and a recording medium for storing a program for executing a clipboard protection method on a computer and, more particularly, to a clipboard protection system in a DRM environment and a recording medium for storing a program for executing a clipboard protection method on a computer, which prevent the leakage of information exceeding allowable rights using a clipboard in a DRM system.

BACKGROUND ART

A clipboard refers to a memory space in which data is temporarily stored when any data is copied or pasted to a file executed by an identical application or different applications. The copy and extraction of data using such a clipboard are functions basically provided by an Operating System (OS), such as Microsoft Windows or Apple Macintosh. The function of copying and extracting data using a clipboard is one of numerous targets that must be managed so as to prevent the leakage of data in a system to which Digital Rights Management (DRM) is applied. For example, when the movement of any data exceeding the allowable right of a user, or the movement of data or the like within the DRM system is attempted on a document to which DRM is applied, there is a need to block the movement of data related to the document to which DRM is applied.

FIG. 1 is a diagram showing a process for storing information in a clipboard in a Microsoft Windows system.

Referring to FIG. 1, the storage of information in a clipboard is performed using interaction among an application, a system, and global memory. First, when the application requests the system to allocate global memory using a GlobalAlloc( ) function (S100), the system provides a handle for the global memory using a Handle( ) function (S105). Next, the application requests the system to lock the global memory using a GlobalLock( ) function (S110), and the system returns the pointer of the allocated global memory in response to the request (S115). Thereafter, the application copies data to the allocated global memory using the returned pointer (S120). Then, the application requests the system to record data in the clipboard by sequentially using functions, such as OpenClipboard( ), EmptyClipboard( ), SetClipboardData( ), and CloseClipboard( ) functions (S125 to S140), and finally requests the system to unlock the global memory using a GlobalUnlock( ) function (S145). FIG. 2 illustrates data stored in the clipboard.

FIG. 3 is a diagram showing a process for extracting data from a clipboard in a Microsoft Windows system.

Referring to FIG. 3, an operation of extracting information from a clipboard starts at the determination of whether an available clipboard format that can be processed by an application is present in a current clipboard, using an IsClipboardFormatAvailable( ) function (S300). Then, the application requests the system to open the clipboard using an OpenClipboard( ) function (S305). Next, the application requests the system to provide data stored in the clipboard using a GetClipboardData( ) function (S310), and the system provides a handle for the data to the application using a Handle( ) function in response to the request (S315). Next, the application requests the system to lock the global memory using a GlobalLock( ) function (S320), and the system returns the pointer of the allocated global memory in response to the request (S325). Then, the application reads data from the allocated global memory using the returned pointer (S330). Thereafter, the application requests the system to unlock the global memory using a GlobalUnlock( ) function (S335), and requests the system to close the clipboard using a CloseClipboard( ) function (S340).

As described above with reference to FIGS. 1 to 3, the storage and extraction of data in and from the clipboard are performed using Application Programming Interface (API) functions related to the clipboard between the application and the system, and there is a possibility that data stored in the clipboard will leak during such a process. The present applicant proposed a technique for encrypting data or an object to which DRM is applied, among pieces of data or objects to be stored in the clipboard, and storing the encrypted data in order to prevent the leakage of data in the clipboard, and this technique was filed and registered as Korean Patent Registration No. 10-0928467. The patent filed by the present applicant includes a configuration for encrypting and decrypting data when the storage and reading of data in and from the clipboard are performed by a reliable object that is an object to which DRM is applied, among various objects, thus preventing access to the data by an unreliable object that is an object to which DRM is not applied. In this case, the objects are independent targets on which operations for extracting data from the clipboard and pasting the data are performed, and primarily denote processes corresponding to respective applications, but may be documents, sub-windows, or images/text/video within the documents, which are managed by the respective processes. Even in the following description, the term "object" is used as the same meaning. The patent filed by the present applicant does not block an unreliable object from accessing encrypted data stored in the clipboard, and so when clipboard data is requested by an unreliable object, encrypted data is provided to the unreliable object. In this case, there is a problem in that when encrypted data is output by the unreliable object, a program is shut down or an unexpected situation occurs.

DISCLOSURE

Technical Problem

An object of the present invention is to provide a system, which is capable of preventing the leakage of data to which DRM is applied by using a clipboard in a DRM environment, and guaranteeing the free use of the clipboard for data to which DRM is not applied.

Another object of the present invention is to provide a recording medium for storing a program for executing a method, which is capable of preventing the leakage of data to which DRM is applied by using a clipboard in a DRM environment and guaranteeing the free use of the clipboard for data to which DRM is not applied, on a computer.

Technical Solution

In order to accomplish an object of the present invention, a preferred embodiment of a clipboard protection system in a DRM environment according to the present invention is provided, a clipboard protection system for protecting data stored in a clipboard in conjunction with a clipboard management system for storing, extracting and transferring data independently from an application as a basic function of an operating system, the clipboard protection system including an identification information management unit for, when an object desiring to store data in the clipboard is a reliable object, changing first identification information assigned to data to be stored in the clipboard into preset second identification information, managing the second identification information, and outputting second identification information corresponding to identification information of read target data requested to be extracted when the reliable object requests extraction of data stored in the clipboard; a data protection unit for encrypting and outputting data to be stored in the clipboard, and decrypting and outputting encrypted data read from the clipboard; and a control unit for requesting the clipboard management system to record encrypted security data in the clipboard in conjunction with the second identification information, and if a request to extract data stored in the clipboard is received from the reliable object, transferring second identification information corresponding to the identification information of the read target data to the clipboard management system, and requesting the clipboard management system to read encrypted security data from the clipboard and provide the encrypted security data.

In order to accomplish another object of the present invention, a computer-readable recording medium for storing a program for executing a clipboard protection method on a computer is provided, the method protecting data stored in a clipboard in conjunction with a clipboard management system for storing, extracting, and transferring data independently from an application as a basic function of an operating system, the clipboard protection method including (a) when an object desiring to store data in the clipboard is a reliable object, changing first identification information assigned to data to be stored in the clipboard into preset second identification information; (b) encrypting the data to be stored in the clipboard; and (c) providing second identification information corresponding to the data and the encrypted data to the clipboard management system, and then requesting the clipboard management system to record the data in the clipboard.

Advantageous Effects

According to a clipboard protection system in a DRM environment and a recording medium for storing a program for executing a clipboard protection method on a computer in accordance with the present invention, when the storage of data in a clipboard is requested by a reliable object, the data is stored in the clipboard after the change of identification information of the data and the encryption of the data have been performed, and when the reading of data from the clipboard is requested by an unreliable object, a data read operation is performed by an existing clipboard management system, thus blocking the unreliable object from accessing security data. Further, when the reading of data is requested by a reliable object, it is determined whether data requested to be read is present by searching a mapping table managed by the clipboard management system and a mapping table managed by the clipboard protection system for both identification information of the data requested to be read and changed identification information, thus performing a data read operation without causing any errors.

BEST MODE

Hereinafter, preferred embodiments of a clipboard protection system in a DRM environment and a recording medium for storing a program for executing a clipboard protection method on a computer according to the present invention will be described in detail with reference to the attached drawings.

Figure 4:
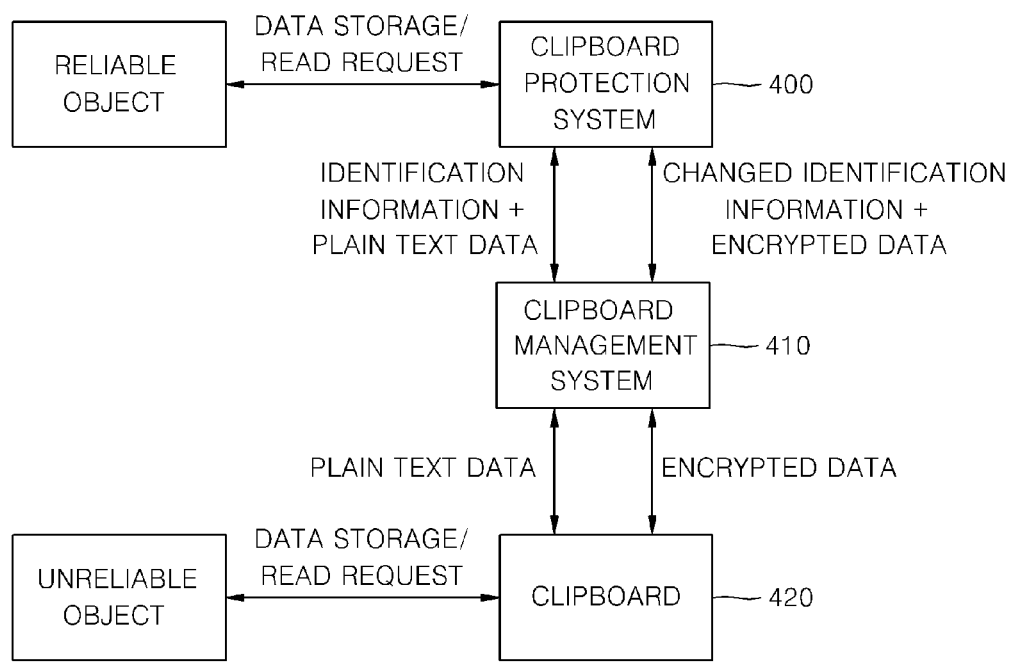
FIG. 4 is a diagram showing a relationship among objects, a clipboard protection system, a clipboard management system, and a clipboard in a DRM environment according to the present invention.

FIG. 4 is a configuration diagram showing a relationship among objects, a clipboard protection system, a clipboard management system, and a clipboard in a DRM environment according to the present invention.

Referring to FIG. 4, a clipboard protection system 400 according to the present invention is interposed between a reliable object and a clipboard management system 410 and is configured to perform an operation of storing and reading data in and from a clipboard 420, the operation being requested by a reliable object to which DRM is applied. The clipboard management system 410 is a component for performing a clipboard function basically provided by an Operating System (OS), and performs operations based on clipboard use requests made by an unreliable object to which DRM is not applied and by the clipboard protection system 400 (that is, a request to store data in the clipboard and a request to read data from the clipboard). The clipboard protection system 400 according to the present invention is basically implemented using an Application Programming Interface (API) hooking function. Furthermore, the clipboard protection system 400 according to the present invention can denote an information processing device, such as a computer on which software having a clipboard protection function is loaded. In the system shown in FIG. 4, discrimination between a reliable object and an unreliable object is performed by a DRM module (not shown) for processing DRM, and the clipboard protection system 400 discriminate a reliable object from an unreliable object based on the results of processing of the DRM module.

As shown in FIG. 4, access to the clipboard by the unreliable object is made by the clipboard management system 410 provided by the operating system, and access to the clipboard by the reliable object is made by the clipboard protection system 400. If the clipboard protection system 400 is implemented using an API hooking function, the clipboard protection system 400 is operated together when the DRM module is operated or the operating system runs. Further, the determination of whether an object desiring to access the clipboard 420 is a reliable object or an unreliable object is basically performed by the DRM module, but such a determination function may also be performed by the clipboard protection system 400. Furthermore, when a reliable object accesses the clipboard, the clipboard protection system 400 performs a required procedure by hooking functions related to the clipboard 420 (in particular, a SetClipboardData( ) function and a GetClipboardData( ) function), and thereafter transfers the results of the performance to the clipboard management system 410.

The clipboard management system 410 stores data in the clipboard 420 in conjunction with data identification information included in a function that commands data to be stored in the clipboard 420 and that is input from the object (e.g., a SetClipboardData( ) function provided by the Windows OS), or data identification information included in a function that commands data to be stored in the clipboard 420 and that is input from the clipboard protection system 400. In this case, the identification information input from the object is an identifier related to a data format assigned by the object to the data stored in the clipboard 420, and is a standard clipboard format, such as CF_TEXT, CF_OEMTEXT, or CF_UNICODETEXT basically provided by the operating system, or a registered clipboard format randomly created and registered by the user. Further, the identification information input from the clipboard protection system 400 is identification information obtained by the clipboard protection system 400 changing data identification information, included in the function that commands data to be stored in the clipboard 420 and that is input from the object, into a registered clipboard format. Meanwhile, the clipboard management system 410 reads read target data from the clipboard 420 based on identification information included in a function that commands data to be read from the clipboard 420 and that is input from the object or the clipboard protection system 400 (e.g., an IsClipboardDataAvailable( ) function and a GetClipboardData( ) function provided by the Windows OS), and provides the read data to the object or the clipboard protection system 400.

Figure 5:
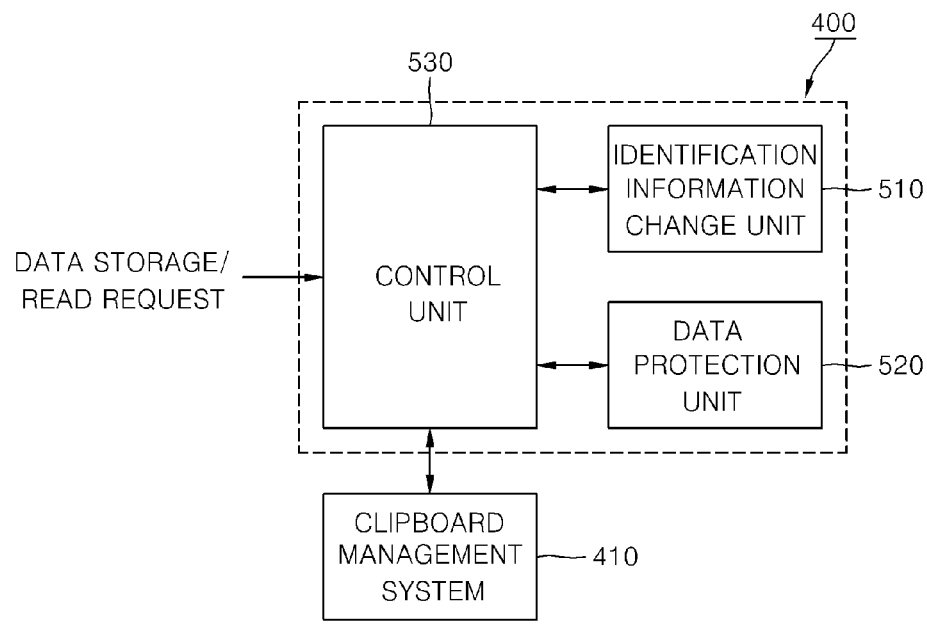
FIG. 5 is a diagram showing the configuration of a first preferred embodiment of a clipboard protection system according to the present invention.

FIG. 5 is a diagram showing the configuration of a preferred embodiment of a clipboard protection system according to the present invention.

Referring to FIG. 5, a preferred embodiment 400 of a clipboard protection system according to the present invention includes an identification information management unit 510, a data protection unit 520, and a control unit 530.

The identification information management unit 510 changes first identification information, uniquely assigned to security data to be stored in the clipboard 420, into preset second identification information. In this case, the first identification information may have a standard clipboard format, such as CF_TEXT, CF_OEMTEXT, or CF_UNICODETEXT basically provided by an operating system according to the format of clipboard data, or a registered clipboard format randomly created and registered by the user. The identification information management unit 510 changes the first identification information into second identification information which is separate identification information uniquely set by the clipboard protection system 400. In this case, in order for the clipboard management system 410 to recognize the second identification information, the second identification information must have the registered clipboard format. Further, when a request to read data stored in the clipboard 420 is input, the identification information management unit 510 outputs second identification information corresponding to the identification information of the read target data. Meanwhile, the identification information management unit 510 may record and manage a corresponding relation between the first identification information and the second identification information in a separate mapping table. This is intended to discriminate between pieces of first identification information and pieces of second identification information corresponding to respective pieces of data when there are a plurality of pieces of data (that is, security data and key information, security data and locale data, etc.) stored in the clipboard 420. When the mapping table is generated in this way, the identification information management unit 510 functions to search for second identification information corresponding to first identification information input from the control unit 530, and provide the second identification information to the control unit 530.

Figure 1:
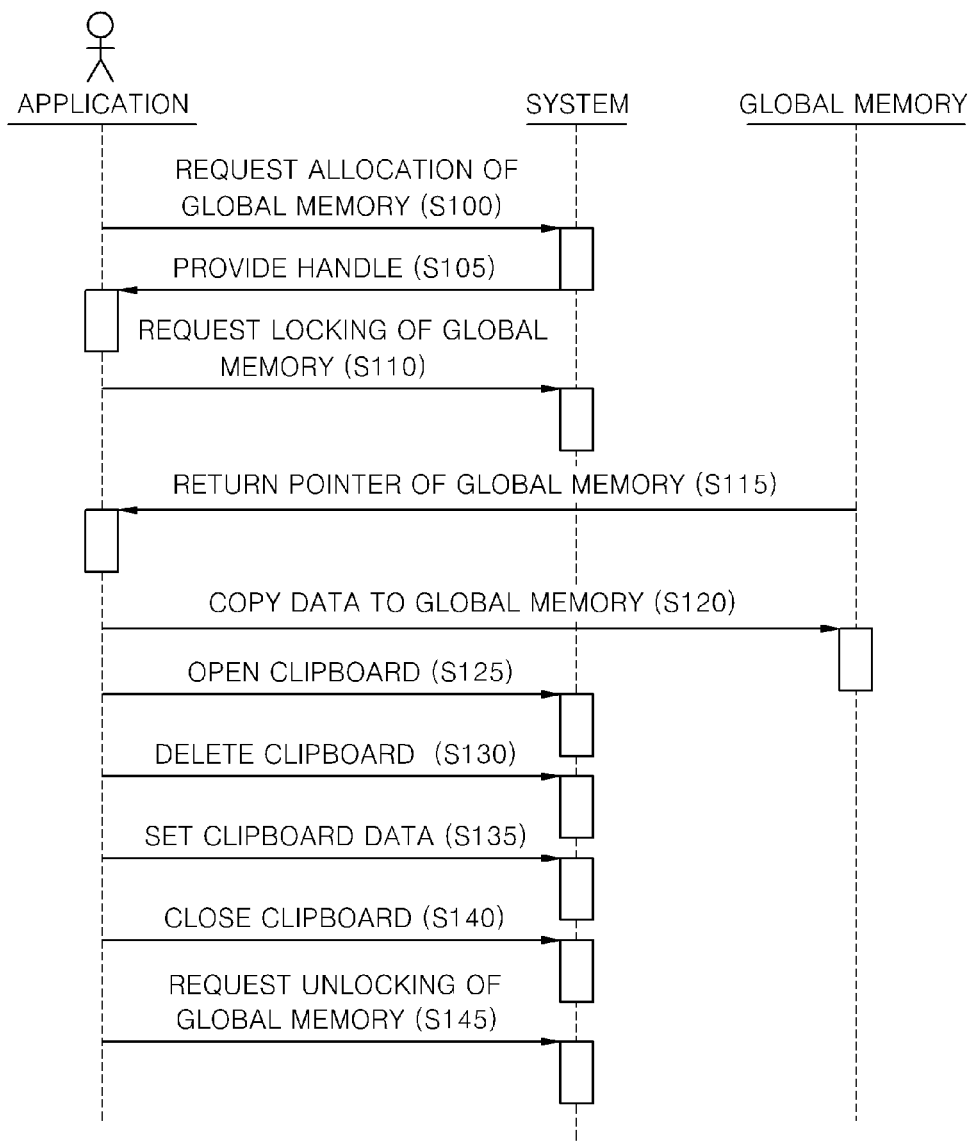
FIG. 1 is a diagram showing a process for storing information in a clipboard in a Microsoft Windows system.

For example, Microsoft (MS) Word program to which DRM is applied corresponds to a reliable object. If the MS Word program is executed, and a user requests the copying of specific text in a specific document with the specific document opened, the Word program performs the operation of storing the corresponding data in the clipboard 420 according to the process shown in FIG. 1 in conjunction with the clipboard management system 410. In this procedure, the clipboard protection system 400 according to the present invention hooks a SetClipboardData( ) function that is output from the Word program so as to store data in the clipboard 420, performs the change of identification information and the encryption of the data, and then outputs the results of the performance to the clipboard management system 410. In this case, a value set as a variable of the SetClipboardData( ) function by the clipboard protection system 400 is the handle of global memory in which the changed second identification information and the encrypted data are stored. Further, the hooking of the clipboard-related function output from the Word program may be performed either by a hooking function that is set to be operated in synchronization with the execution of the Word program or the running of the operating system, or by the control unit 530. Once the SetClipboardData( ) function is hooked, the identification information management unit 510 changes data identification information (e.g., CF_TEXT that is a standard clipboard format) which is the variable of the SetClipboardData( ) function into separate identification information that has been uniquely set (e.g., DRM_CR_TEXT which is a registered clipboard format).

Figure 2:
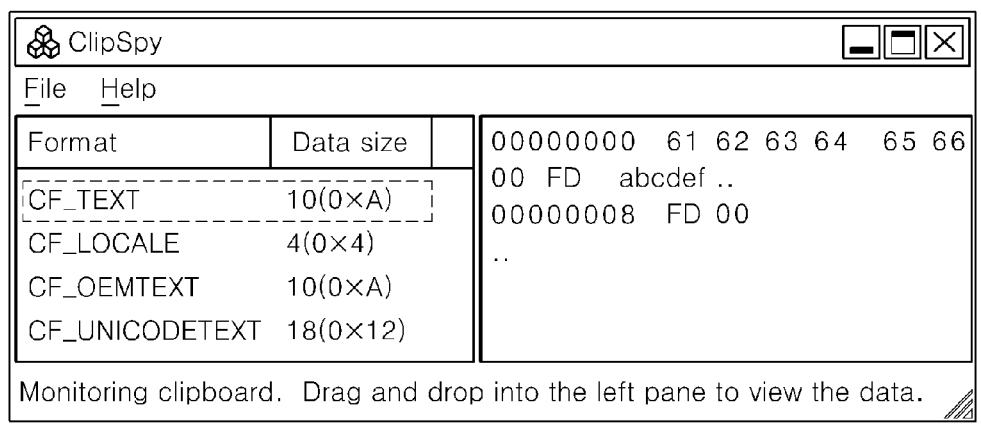
FIG. 2 is a diagram showing data stored in a clipboard.
Figure 3:
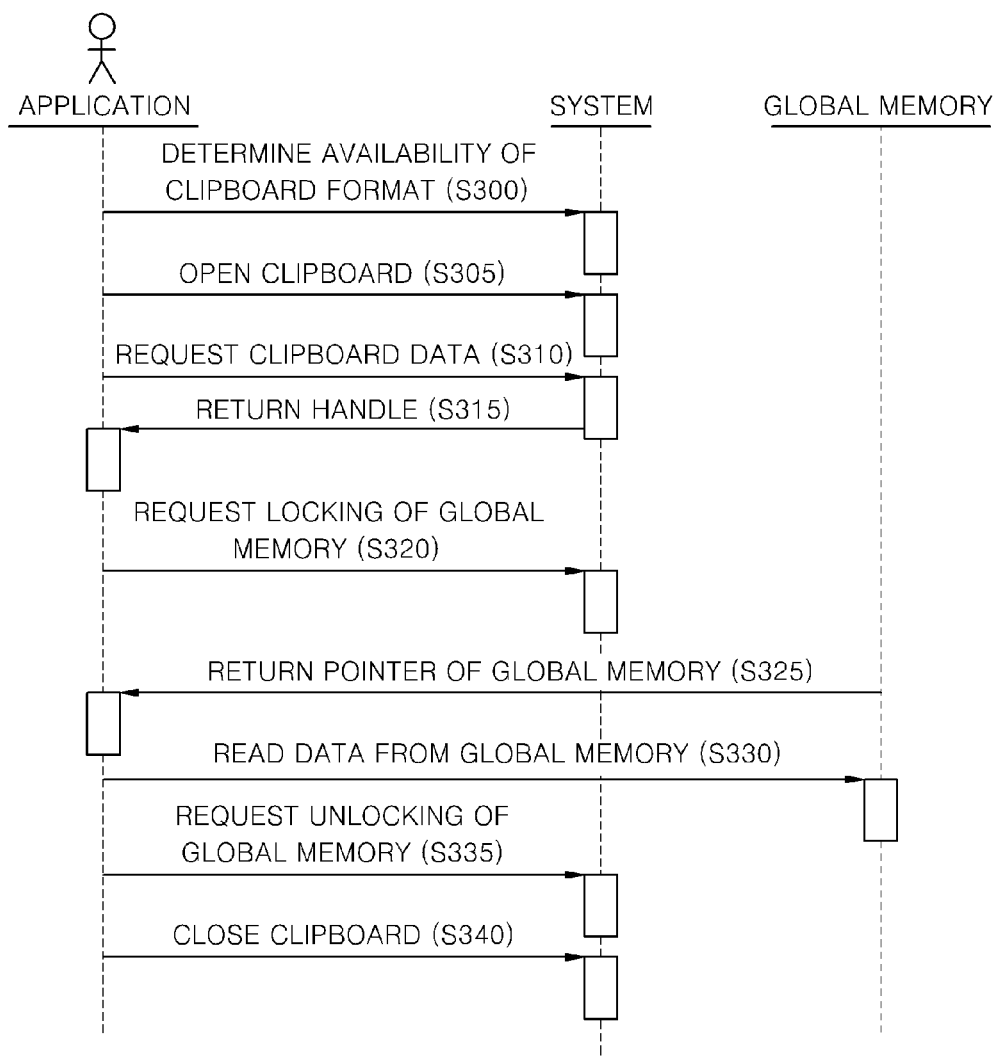
FIG. 3 is a diagram showing a process for reading data from a clipboard in the Microsoft Windows system.

Meanwhile, when the MS Word program that is an application to which DRM is applied is executed, and the user requests the reading of data stored in the clipboard 420 with a specific document opened, the Word program performs the operation of reading the corresponding data from the clipboard according to the process shown in FIG. 2 in conjunction with the clipboard management system 410. During this procedure, the clipboard protection system 400 according to the present invention hooks an IsClipboardData( ) function that is output from the Word program so as to determine whether required data is present in the clipboard 420, and then outputs the same function to the clipboard management system 410. If a response indicating that the corresponding data is present is received from the clipboard management system 410, the clipboard protection system 400 does not hook a GetClipboardData( ) function that is output from the Word program so as to read data from the clipboard 420, or hooks the GetClipboardData( ) function and outputs the hooked function to the clipboard management system 410 without change. In contrast, if a response indicating that the corresponding data is not present is received from the clipboard management system 410, the clipboard protection system 400 hooks the GetClipboardData( ) function that is output from the Word program so as to read data from the clipboard 420. Then, the identification information management unit 510 changes identification information (e.g., CF_TEXT that is a standard clipboard format) which is the variable of the GetClipboardData( ) function into separate identification information that is uniquely set (e.g., DRM_CR_TEXT that is a registered clipboard format).

The data protection unit 520 encrypts and outputs security data to be stored in the clipboard 420, and decrypts and outputs encrypted data read from the clipboard 420. The data protection unit 520 is operated in conjunction with a DRM module (not shown). That is, an encryption key required by the data protection unit 520 to encrypt or decrypt data is obtained from the DRM module. Meanwhile, information about the encryption key may be added to data stored in the clipboard 420 and may be stored in the clipboard 420.

Figure 6:
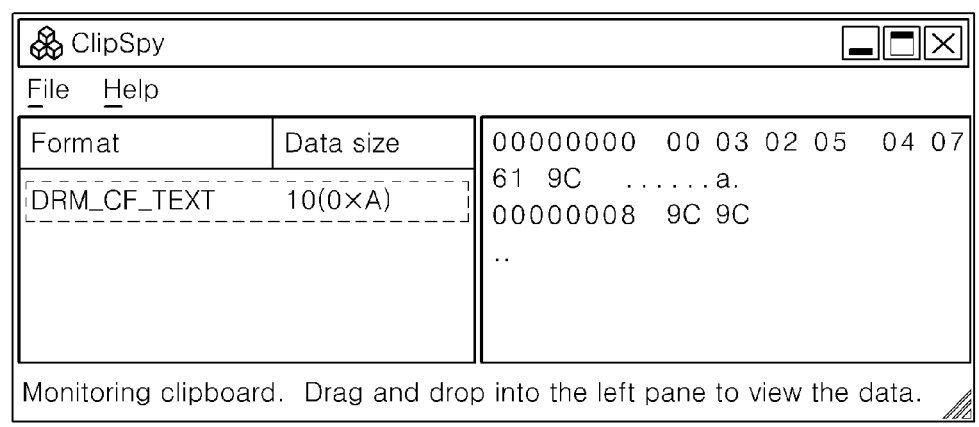
FIG. 6 is a diagram showing data stored in a clipboard 420 after the change of identification information and the encryption of data have been applied by a clipboard protection system 400 according to the present invention.

The control unit 530 controls the overall operation of the clipboard protection system 400 according to the present invention. That is, the control unit 530 hooks an API function related to a request made by a reliable object to store data in the clipboard 420 (that is, the SetClipboardData( ) function) and functions related to a request to read data from the clipboard 420 (that is, the IsClipboardDataAbailable( ) function and the GetClipboardData( ) function), and controls the operation of the identification information management unit 510 and the data protection unit 520. In particular, when the reading of data from the clipboard 420 is requested by the reliable object, the control unit 530 hooks the IsClipboardData( ) function output from the reliable object, transfers the IsClipboardData( ) function to the clipboard management system 410 without change, and performs different procedures depending on the conditions of responses (that is, the presence or non-presence of the corresponding data) from the clipboard management system 410. If a response indicating that the corresponding data is present is received from the clipboard management system 410, the control unit 530 transfers the GetClipboardData( ) function that is output from the reliable object so as to read data from the clipboard 420 to the clipboard management system 410 without change. In contrast, if a response indicating that the corresponding data is not present is received from the clipboard management system 410, the control unit 530 requests the identification information management unit 510 to provide second identification information corresponding to identification information that is the variable of the hooked GetClipboardData( ) function. Further, the second identification information provided by the identification information management unit 510 is transferred to the clipboard management system 410 to request the clipboard management system 410 to read data stored in the clipboard 420. FIG. 6 illustrates data stored in the clipboard 420 after the change of identification information and the encryption of data have been applied by the clipboard protection system 400 according to the present invention.

Figure 7:
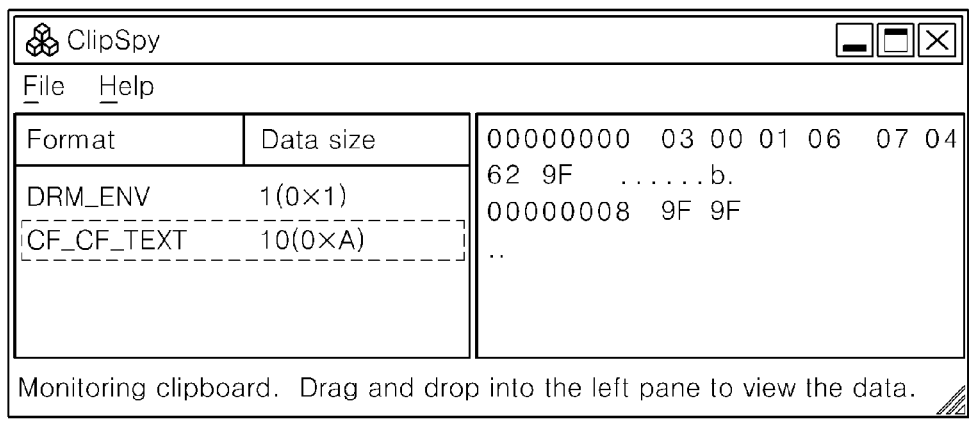
FIG. 7 is a diagram showing security data and key information stored in the clipboard 420 by the clipboard protection system 400 according to the present invention.

Meanwhile, the clipboard protection system 400 according to the present invention may additionally store separate key information in the clipboard 420 so as to decrypt encrypted data, in addition to the operation of storing data in the clipboard 420 by performing the change of identification information and the encryption of data so as to protect the data. Such key information may be either an encryption key itself or information enabling the encryption key to be obtained. For example, the key information may be a distinguished name of a certificate or the identification (ID) of the certificate when Public Key Infrastructure (PKI)-based encryption is applied, may be the pool ID of an encryption key when a key pool is used, and may be a key generation factor when Diffe-Helman and key exchange encryption using Diffe-Helman are applied. Therefore, the clipboard protection system 400 assigns preset second identification information to the key information obtained from the DRM module, and stores the key information in the clipboard 420. The obtainment of the key information is performed by a separate key management unit (not shown), or by the data protection unit 530, and the storage of the key information is performed by the data protection unit 530. FIG. 7 illustrates security data and key information stored in the clipboard 420 by the clipboard protection system 400 according to the present invention.

Figure 8:
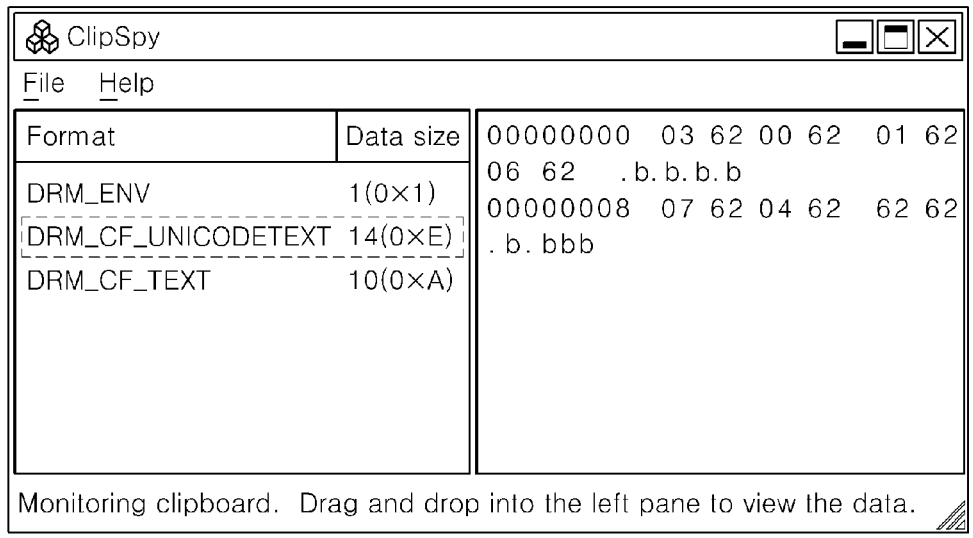
FIG. 8 is a diagram showing security data, key information, and additional data stored in the clipboard 420 by the clipboard protection system 400 according to the present invention.

Furthermore, the clipboard protection system 400 according to the present invention may perform the operation of storing format-converted additional data in the clipboard 420, in addition to the operation of storing data in the clipboard 420 by changing identification information and encrypting the data so as to protect data. Generally, when data having identification information in a format used in the system is input, the operating system additionally generates data having identification information in other formats, in addition to the input data, and stores the generated data together with the input data in the clipboard 420. For example, when data having a CF_TEXT format is input, the clipboard management system 410 automatically generates data in formats, such as CF_LOCALE, CF_OEMTEXT, and CF_UNICODETEXT based on the CF_TEXT information, and stores the generated data in the clipboard 420. However, when the security data is encrypted, such an automatic change function is not supported. Therefore, in order to implement a basic conversion function provided by the operating system while maintaining a data protection function, the clipboard protection system 400 converts security data before being encrypted into another type of data, assigns preset second identification information to the corresponding data, encrypts the corresponding data, and stores the encrypted data in the clipboard 420. The conversion and storage of such data are performed either by a separately provided additional data generation unit (not shown), or by the data protection unit 530. FIG. 8 illustrates security data, key information, and additional data stored in the clipboard 420 by the clipboard protection system 400 according to the present invention.

Figure 9:
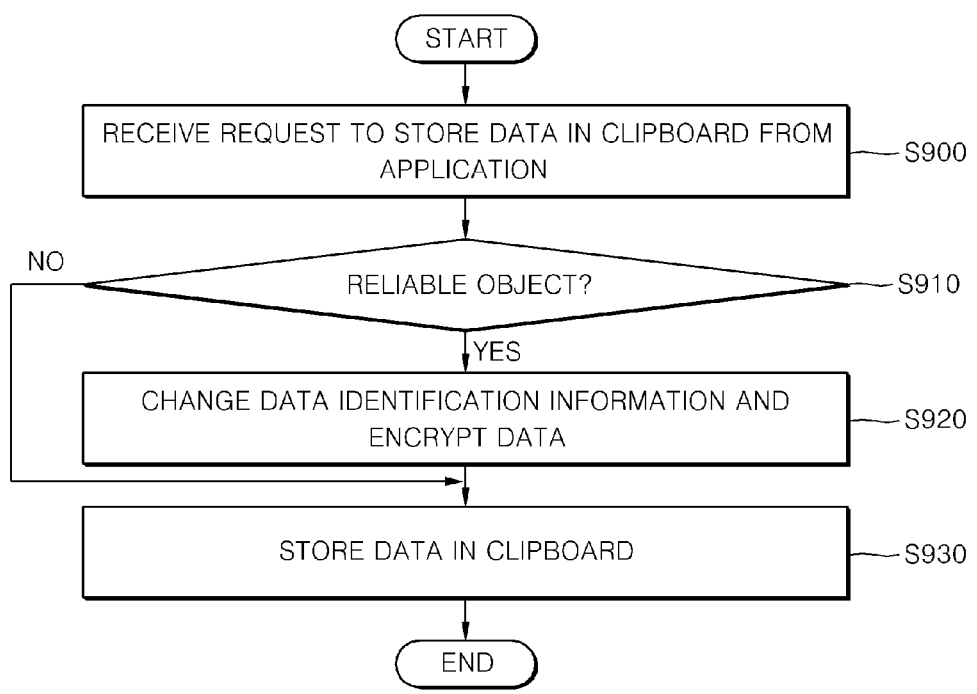
FIG. 9 is a flowchart showing a procedure for storing data in a clipboard in a clipboard protection method according to the present invention.

FIG. 9 is a flowchart showing a procedure for storing data in a clipboard in a clipboard protection method according to the present invention.

Referring to FIG. 9, when a request to store data in a clipboard 410 is received from an application (S900), the DRM module determines whether the application that requested the storage of data is a reliable object or an unreliable object (S910). If it is determined that the corresponding application is a reliable object, the clipboard protection system 400 performs the change of identification information of data and the encryption of the data (S920). Further, the clipboard management system 410 receives the results of the change of the identification information and the encryption of the data, and stores the results in the clipboard 420 (S930). In contrast, if it is determined that the corresponding application is an unreliable object, the data is directly stored in the clipboard 420 by the clipboard management system 410 without going through the clipboard protection system 400 (S930).

Figure 10:
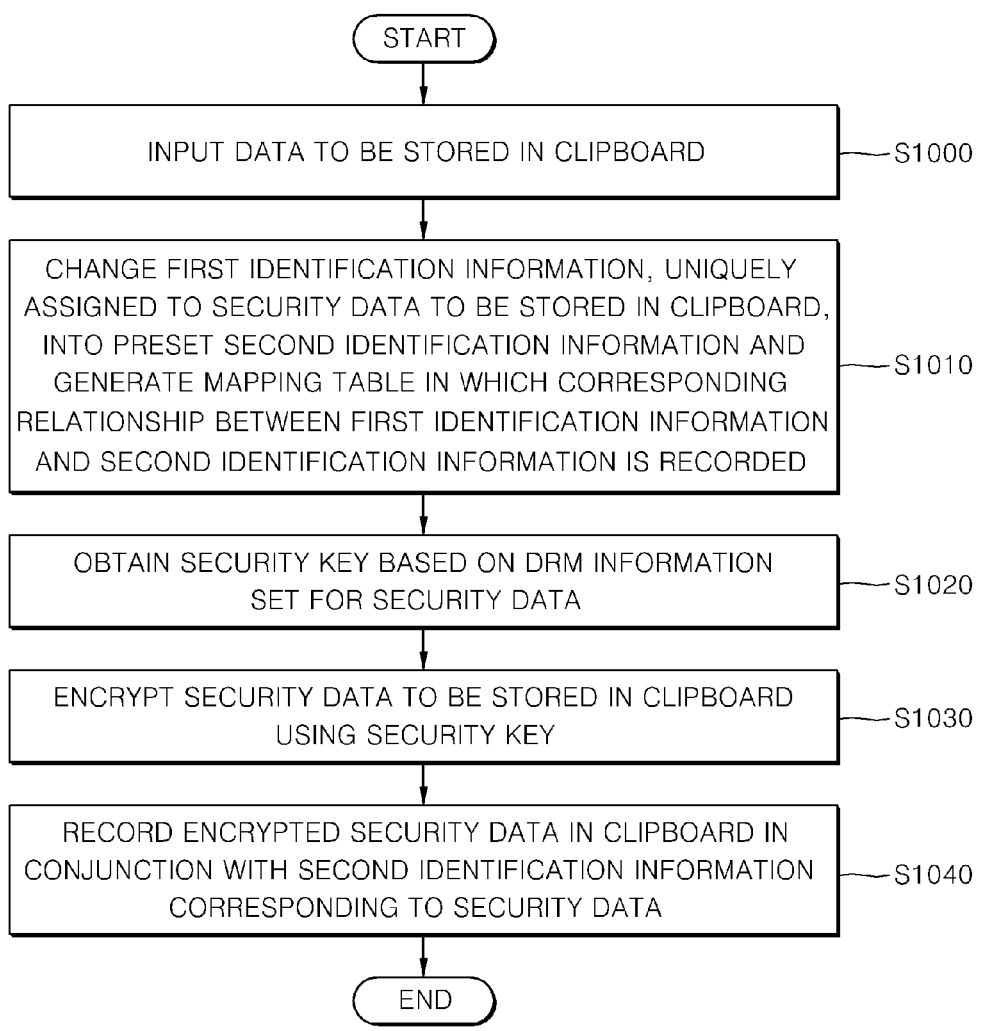
FIG. 10 is a flowchart showing a procedure for performing a first embodiment related to the change of data identification information and the encryption of data in FIG. 9 according to the present invention.

FIG. 10 is a flowchart showing a procedure for performing a first embodiment related to the change of data identification information and the encryption of data in FIG. 9 according to the present invention. The first embodiment of FIG. 10 shows a case where the change of identification information and the encryption of data are performed on all data accessed by the reliable object.

Referring to FIG. 10, when data to be stored in a clipboard is input (S1000), the clipboard protection system 400 changes first identification information (e.g., CF_TEXT), which is uniquely assigned to security data to be stored in the clipboard, to second identification information (e.g., DRM_CR_TEXT) which is preset, and then generates a mapping table in which a corresponding relation between the first identification information and the second identification information is recorded (S1010). Next, the clipboard protection system 400 obtains a security key from the DRM module based on DRM information set for the security data (S1020). Then, the clipboard protection system 400 encrypts the security data to be stored in the clipboard 420 using the security key (S1030). Next, the clipboard protection system 400 transfers the second identification information and the encrypted security data to the clipboard management system 410, and the clipboard management system 410 records the encrypted security data in the clipboard 420 in conjunction with the received second identification information (S1040).

Figure 11:
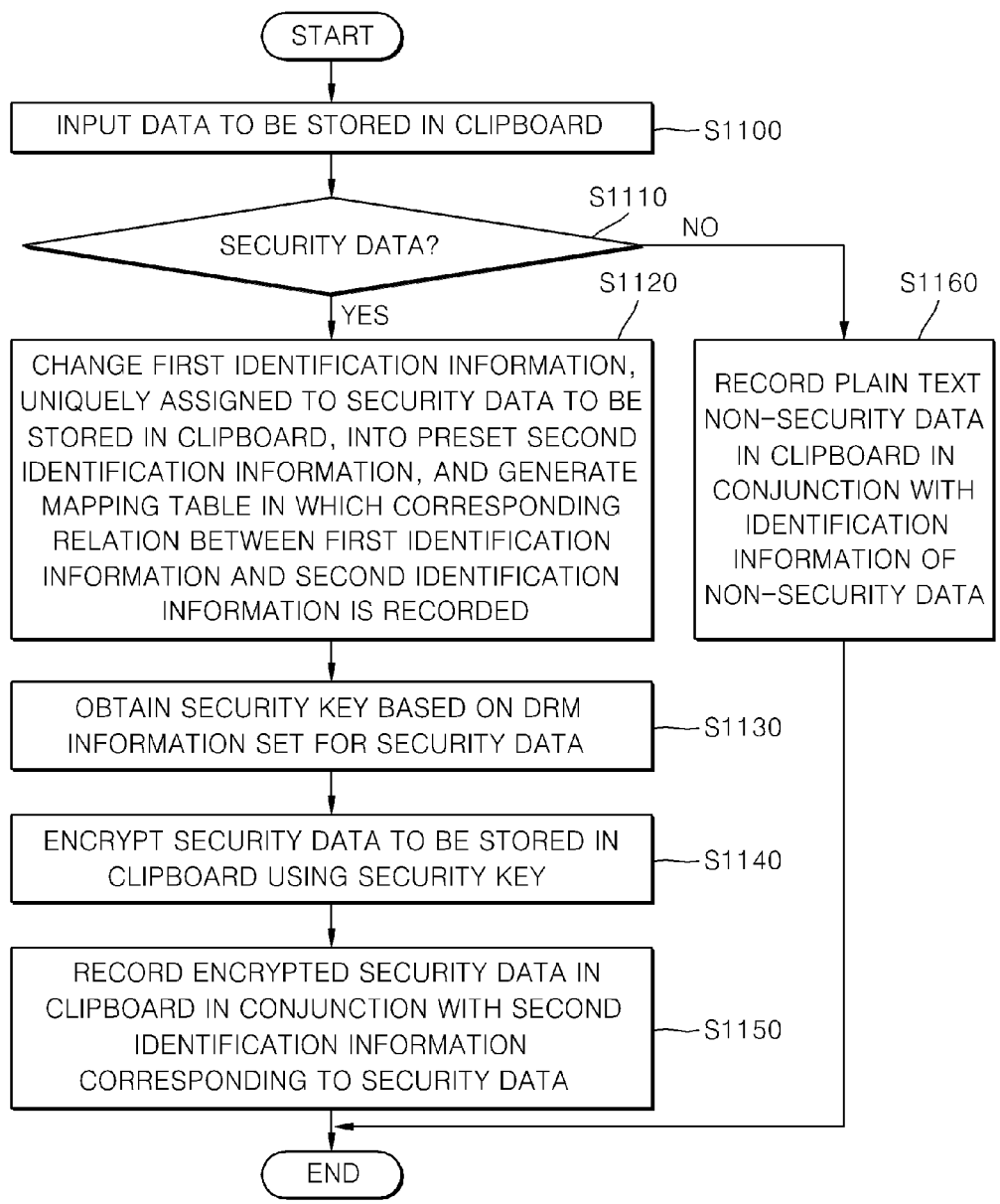
FIG. 11 is a flowchart showing a procedure for performing a second embodiment related to the change of data identification information and the encryption of data in FIG. 9 according to the present invention.

FIG. 11 is a flowchart showing a procedure for performing a second embodiment related to the change of data identification information and the encryption of data in FIG. 9 according to the present invention. The second embodiment shown in FIG. 10 shows a case where the change of identification information and the encryption of data are performed only on security data to be protected among pieces of data accessed by the reliable object.

Referring to FIG. 11, when data to be stored in the clipboard 420 is input (S1100), the clipboard protection system 400 determines whether the corresponding data is security data to be protected (S1110). For example, when DRM is applied to a Microsoft Word program, documents to which DRM is applied and documents to which DRM is not applied may be present among documents loaded on the Word program. In this case, documents to which DRM is applied are classified as security data, and documents to which DRM is not applied are classified as non-security data. If the input data is determined to be security data, the clipboard protection system 400 changes first identification information (e.g., CF_TEXT), which is uniquely assigned to the security data to be stored in the clipboard, into second identification information (e.g., DRM_CR_TEXT) which is preset, and generates and manages a mapping table in which a corresponding relation between the first identification information and the second identification information is recorded (S1120). Next, the clipboard protection system 400 obtains a security key from the DRM module based on DRM information set for the security data (S1130). Then, the clipboard protection system 400 encrypts the security data to be stored in the clipboard 420 using the security key (S1140). Next, the clipboard protection system 400 transfers the second identification information and the encrypted security data to the clipboard management system 410, and the clipboard management system 410 records the encrypted security data in the clipboard 420 in conjunction with the received second identification information (S1150). In contrast, if the input data is determined to be non-security data, the clipboard protection system 400 transfers the non-security data and the identification information thereof to the clipboard management system 410. Further, the clipboard management system 410 records the plain text non-security data in the clipboard 420 in conjunction with the received identification information (S1160).

Figure 12:
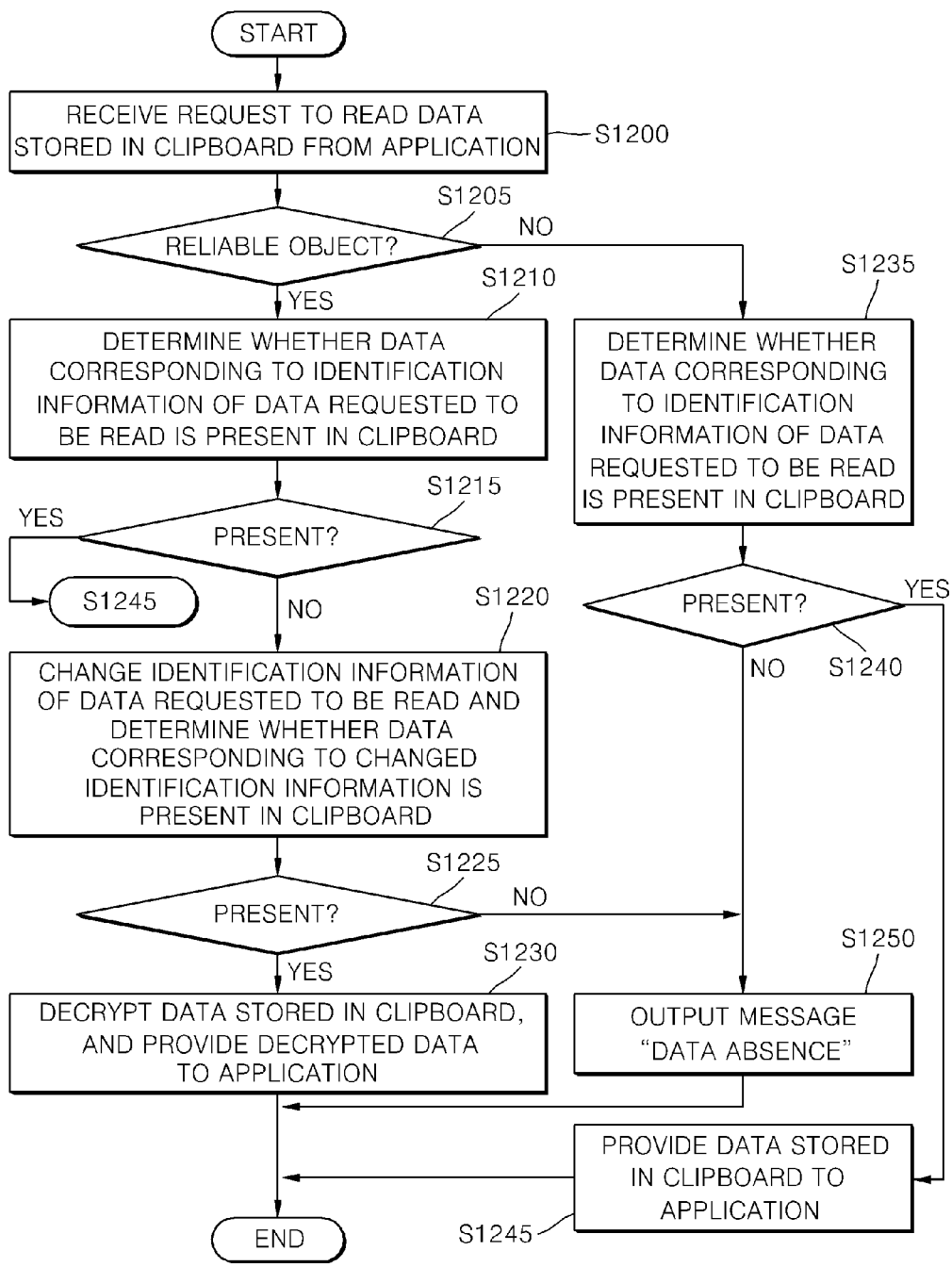
FIG. 12 is a flowchart showing a procedure for performing a first embodiment related to an operation of reading data stored in the clipboard in the clipboard protection method according to the present invention.

FIG. 12 is a flowchart showing a procedure for performing a first embodiment related to an operation of reading data stored in the clipboard in the clipboard protection method according to the present invention.

Referring to FIG. 12, when a request to read data stored in the clipboard is received from an application (S1200), the DRM module determines whether the corresponding application is a reliable object (1205). If the application is determined to be a reliable object, the clipboard protection system 400 determines, via the clipboard management system 410, whether the identification information of read target data requested to be read is present (S1210). In response to such determination, if a response indicating that the identification information of the read target data is present is received from the clipboard management system 410 (S1215), the clipboard protection system 400 transfers the identification information of the read target data to the clipboard management system 410, and the clipboard management system 410 provides plain text data stored in the clipboard 420 to the application (S1245). In contrast, if a response indicating that the identification information of the read target data is not present is received from the clipboard management system 410 (S1215), the clipboard protection system 400 changes the identification information of the data requested to be read into second identification information, and determines whether second identification information corresponding to the read target data is present (S1220). If second identification information corresponding to the read target data is not present (S1225), the clipboard protection system 400 outputs the message "data absence" to the application (S1250). In contrast, if second identification information corresponding to the read target data is present (S1225), the clipboard protection system 400 transfers the second identification information to the clipboard management system 410, requests the clipboard management system 410 to read data corresponding to the second identification information from the clipboard 400, decrypts the data received from the clipboard management system 410, and provides the decrypted data to the application (S1230).

Meanwhile, if it is determined at step S1205 that the application that requested the reading of data is an unreliable object, the clipboard protection system 400 transfers the identification information of read target data to the clipboard management system 410, and the clipboard management system 410 determines whether identification information corresponding to the read target data is present (S1235). If identification information corresponding to the read target data is present (S1240), the clipboard management system 410 reads the read target data from the clipboard 420, and provides the read data to the application (S1245). In contrast, if identification information corresponding to the read target data is not present (S1240), the clipboard management system 410 outputs the message "data absence" to the application (S1250).

Figure 13:
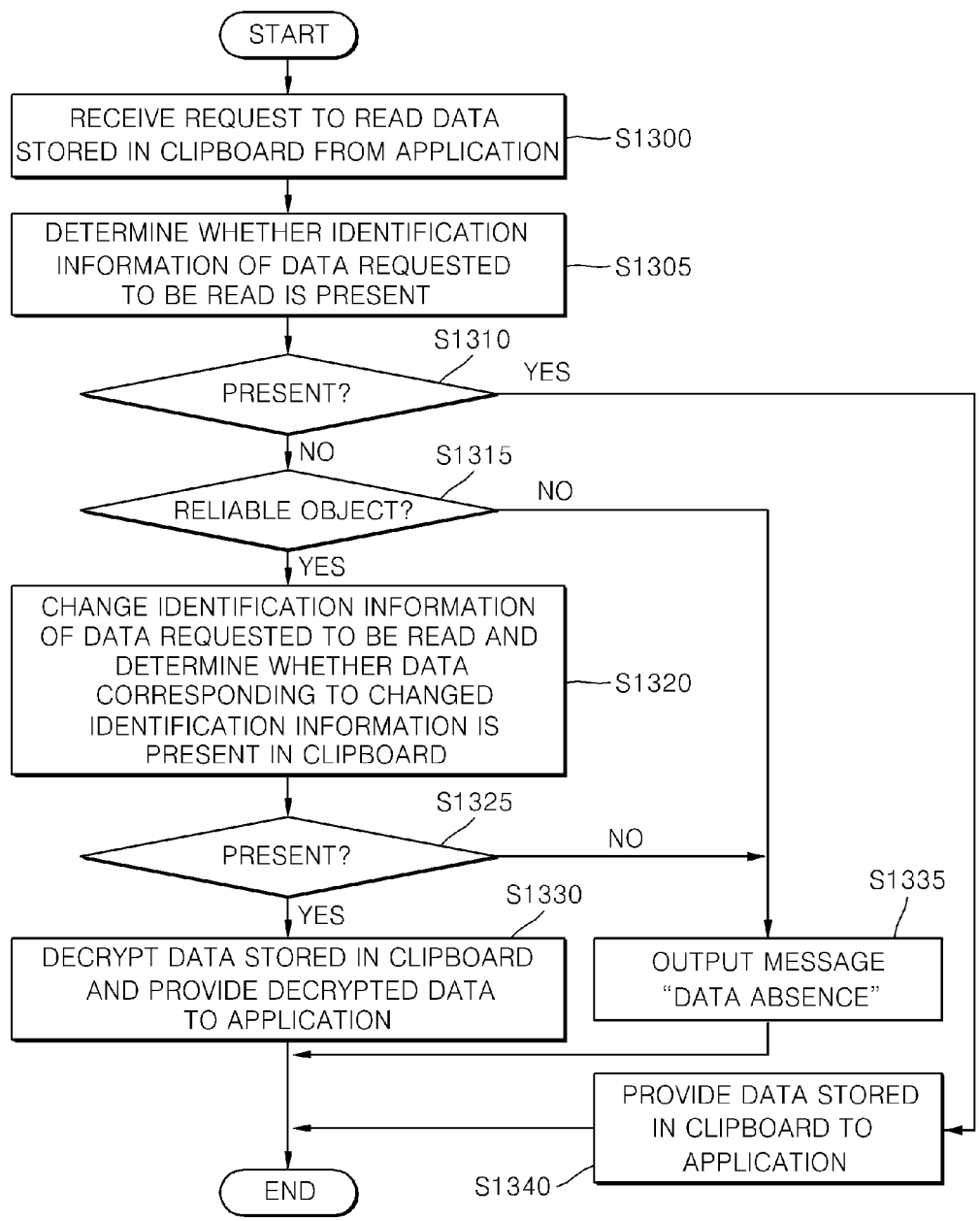
FIG. 13 is a flowchart showing a procedure for performing a second embodiment related to an operation of reading data stored in the clipboard in the clipboard protection method according to the present invention.

FIG. 13 is a flowchart showing a procedure for performing a second embodiment related to an operation of reading data stored in the clipboard in the clipboard protection method according to the present invention.

Referring to FIG. 13, when a request to read data stored in the clipboard 420 is received from an application (S1300), the clipboard protection system 400 determines, via the clipboard management system 410, whether the identification information of read target data requested to be read is present (S1305). In response to the determination, the clipboard management system 410 transfers the results of determining whether identification information corresponding to the read target data is present to the clipboard protection system 400. If identification information corresponding to the read target data is present (S1310), the clipboard protection system 400 transfers the identification information of the read target data to the clipboard management system 410 and requests the clipboard management system 410 to read the data, and the clipboard management system 410 reads the read target data from the clipboard 420 and provides the read data to the application (S1340). In contrast, if identification information corresponding to the read target data is not present (S1310), the clipboard protection system 400 determines, via the DRM module, whether the corresponding application is a reliable object (S1315). If the application is determined to be an unreliable object, the clipboard protection system 400 outputs the message "data absence" to the application (S1335). In contrast, if the application is determined to be a reliable object, the clipboard protection system 400 changes the identification information of the data requested to be read into second identification information, and determines whether second identification information corresponding to the read target data is present (S1320). If it is determined that the second identification information corresponding to the read target data is present (S1325), the clipboard protection system 400 transfers the second identification information to the clipboard management system 410, requests the clipboard management system 410 to read data corresponding to the second identification information from the clipboard 400, decrypts the data received from the clipboard management system 410, and provides the decrypted data to the application (S1330). In contrast, if second identification information corresponding to the read target data is not present (S1325), the clipboard protection system 400 outputs the message "data absence" to the application (S1335).

The above-described clipboard protection system and method according to the present invention are configured to, when the storage of data in a clipboard is requested by a reliable object, store the data in the clipboard after the change of the identification information of the data and the encryption of the data have been performed. Further, when the reading of data is requested by an unreliable object, the operation of reading the data is performed by an existing clipboard management system, thus blocking the unreliable object from accessing the security data. In contrast, when the reading of data is requested by a reliable object, it is determined whether data requested to be read is present by searching a mapping table managed by searching the clipboard management system and a mapping table managed by the clipboard protection system for the identification information of the data requested to be read and changed identification information, thus performing a data read operation without causing any errors. Meanwhile, in the above-described embodiments, different operations are performed depending on the type of object (that is, a reliable object and an unreliable object). However, the present invention can also be applied even to lower objects managed by the reliable object (e.g., documents loaded by a Microsoft Word program). In this case, procedures for determining whether the object is a reliable object and determining whether the lower objects are reliable objects (that is, whether DRM has been applied) are performed either sequentially or simultaneously. Thereafter, only in cases where the reliability of the lower objects of the reliable object is guaranteed, the change of identification information and encryption of data are performed. Only in cases where a request to read data is received from the lower objects of the reliable object, it is determined whether the data requested to be read is present by searching a mapping table managed by the clipboard management system and a mapping table managed by the clipboard protection system for the identification information of the data requested to be read and the changed identification information.

The present invention may be implemented as computer-readable code stored in a computer-readable recording medium. The computer-readable recording medium includes all types of storage devices in which computer system-readable data is stored. Examples of the computer-readable recording medium are Read Only Memory (ROM), Random Access Memory (RAM), Compact Disk-Read Only Memory (CD-ROM), magnetic tape, a floppy disk, and an optical data storage device. Furthermore, the computer-readable recording medium may be implemented as carrier waves (for example, in the case of transmission over the Internet). Moreover, the computer-readable medium may be distributed across computer systems connected via a network, so that computer-readable code can be stored and executed in a distributed manner.

Although the preferred embodiments of the present invention have been illustrated and described, the present invention is not limited to the above-described specific preferred embodiments, and those having ordinary knowledge in the technical field to which the present invention pertains can make various modifications and variations without departing from the gist of the present invention that is claimed in the attached claims. Such modifications and variations fall within the scope of the claims.

The invention claimed is:

1. A clipboard protection system for protecting data stored in a clipboard in conjunction with a clipboard management system for storing, extracting and transferring data independently from an application as a basic function of an operating system, the clipboard protection system comprising:

an identification information management unit for, when an object desiring to store data in the clipboard is a reliable object, changing first identification information assigned to data to be stored in the clipboard into preset second identification information, managing the second identification information, and outputting second identification information corresponding to identification information of read target data requested to be extracted when the reliable object requests extraction of data stored in the clipboard;

a data protection unit for encrypting and outputting data to be stored in the clipboard, and decrypting and outputting encrypted data read from the clipboard;

a control unit for requesting the clipboard management system to record encrypted security data in the clipboard in conjunction with the second identification information;

the control unit being further for, if a request to extract data stored in the clipboard is received from the reliable object, requesting to determine whether the identification information of the read target data is present;

the control unit being further for, if a response indicating that the identification information of the read target data is not present is received in response to the request, transferring second identification information corresponding to the identification information of the read target data to the clipboard management system, and requesting the clipboard management system to read encrypted security data from the clipboard using the second identification information and provide the encrypted security data; and the control unit being further for, if a response indicating that the identification information of the read target data is present is received in response to the request, requesting the clipboard management system to read the read target data from the clipboard without using the second identification information and provide the read target data.

2. The clipboard protection system of claim 1, wherein the first identification information is an identifier for a data format assigned to data desired by the reliable object to be stored in or extracted from the clipboard, and is one of a standard clipboard format basically provided by the operating system and a registered clipboard format randomly created and registered by a user.

3. The clipboard protection system of claim 2, wherein the second identification information is an identifier for a data format uniquely assigned to each piece of first identification information by the identification information management unit and has a format identical to the registered clipboard format.

4. The clipboard protection system of claim 1, wherein the reliable object is an object to which Digital Rights Management (DRM) is applied.

5. The clipboard protection system of claim 4, wherein the control unit is configured to, if a request to store data is received from a lower object to which DRM is applied, among lower objects managed by the reliable object, provide the first identification information to the identification information management unit and perform control such that the data is stored in the clipboard after change of the identification information and encryption of the data have been performed.

6. The clipboard protection system of claim 4, wherein the control unit is configured to, if a request to extract data is received from a lower object to which DRM is applied, among lower objects managed by the reliable object, transfer the second identification information corresponding to the identification information of the read target data to the clipboard management system and request the clipboard management system to provide encrypted security data stored in the clipboard.

7. The clipboard protection system of claim 4, further comprising a DRM unit for providing a security key based on DRM information set for the data, wherein the data protection unit obtains a security key by providing the DRM information obtained from the data to the DRM unit, and then performs encryption and decryption of the data.

8. A computer-readable recording medium for storing a program for executing a clipboard protection method on a computer, the method protecting data stored in a clipboard in conjunction with a clipboard management system for storing, extracting, and transferring data independently from an application as a basic function of an operating system, comprising:

(a) when an object desiring to store data in the clipboard is a reliable object, changing first identification information assigned to data to be stored in the clipboard into preset second identification information;

(b) encrypting the data to be stored in the clipboard;

(c) providing second identification information corresponding to the data and the encrypted data to the clipboard management system, and then requesting the clipboard management system to record the data in the clipboard;

(d) if a request to read data recorded in the clipboard is received from the reliable object, requesting the clipboard management system to determine whether identification information of read target data requested to be extracted is present;

(e) if a response indicating that the identification information of the read target data is present is received from the clipboard management system, requesting the clipboard management system to read the read target data from the clipboard without using the second identification information and provide the read target data, whereas if a response indicating that the identification information of the read target data is not present is received from the clipboard management system, transferring second identification information corresponding to the identification information of the read target data to the clipboard management system, and then requesting the clipboard management system to read encrypted security data from the clipboard using the second identification information and provide the encrypted security data; and (f) decrypting the encrypted security data read from the clipboard, and providing the decrypted data to the reliable object.

9. The recording medium of claim 8, wherein the reliable object is an object to which Digital Rights Management (DRM) is applied.

10. The recording medium of claim 9, wherein (b) comprises:

(b1) obtaining a security key based on DRM information set for the data; and (b2) encrypting the data to be stored in the clipboard using the security key.

11. The recording medium of claim 9, wherein if a request to store data is received from a lower object to which DRM is applied, among lower objects managed by the reliable object, (a) to (c) are performed.

12. The recording medium of claim 11, wherein (b) comprises:

(b1) obtaining a security key based on DRM information set for the data; and (b2) encrypting the data to be stored in the clipboard using the security key.

13. The recording medium of claim 8, wherein the first identification information is an identifier for a data format assigned to data desired by the reliable object to be stored in or extracted from the clipboard, and is one of a standard clipboard format basically provided by the operating system and a registered clipboard format randomly created and registered by a user.

14. The recording medium of claim 13, wherein the second identification information is an identifier for a data format uniquely assigned to each piece of first identification information and has a format identical to the registered clipboard format.

15. The recording medium of claim 13, wherein (b) comprises:

(b1) obtaining a security key based on DRM information set for the data; and (b2) encrypting the data to be stored in the clipboard using the security key.

16. The recording medium of claim 8, wherein (b) comprises:

(b1) obtaining a security key based on DRM information set for the data; and (b2) encrypting the data to be stored in the clipboard using the security key.

17. The recording medium of claim 8, wherein the reliable object is an object to which Digital Rights Management (DRM) is applied.

18. The recording medium of claim 8, wherein the first identification information is an identifier for a data format assigned to data desired by the reliable object to be stored in or extracted from the clipboard, and is one of a standard clipboard format basically provided by the operating system and a registered clipboard format randomly created and registered by a user.

* * * * *